March 10, 1953 A. A. SAUL 2,631,068
LUBRICATION OF TRACK-BORNE MECHANISM
Filed June 10, 1947
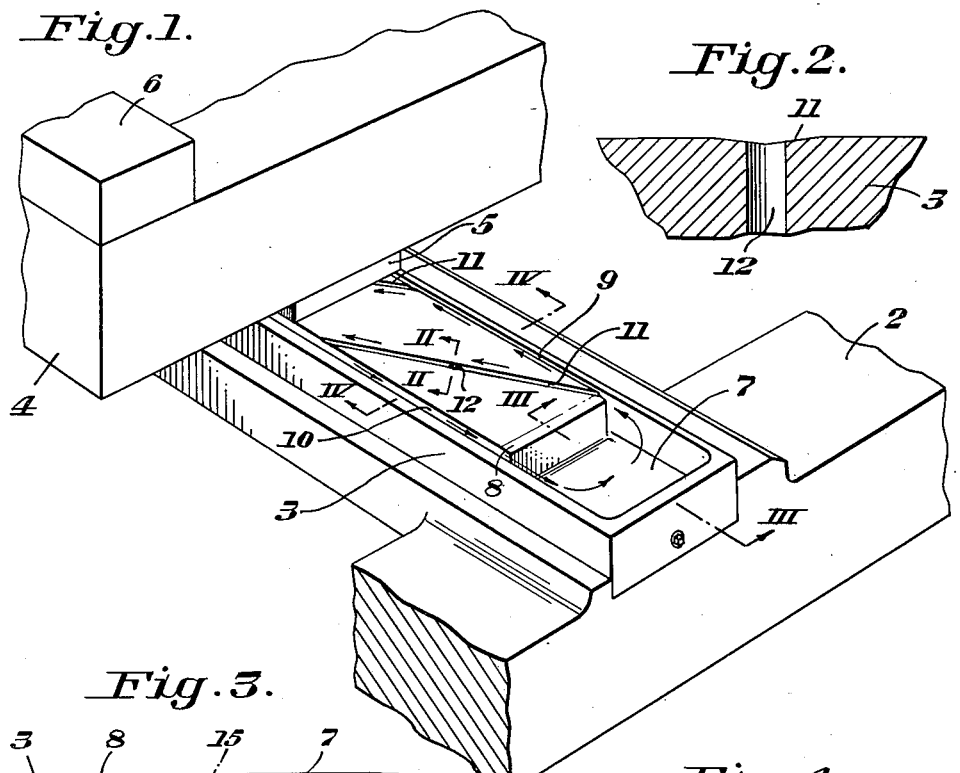
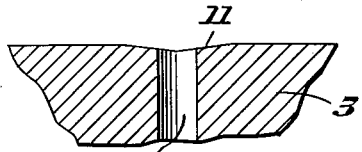
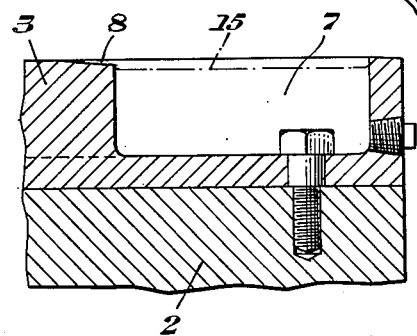
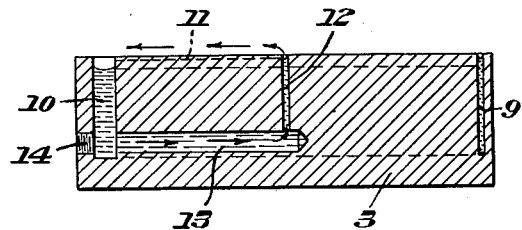
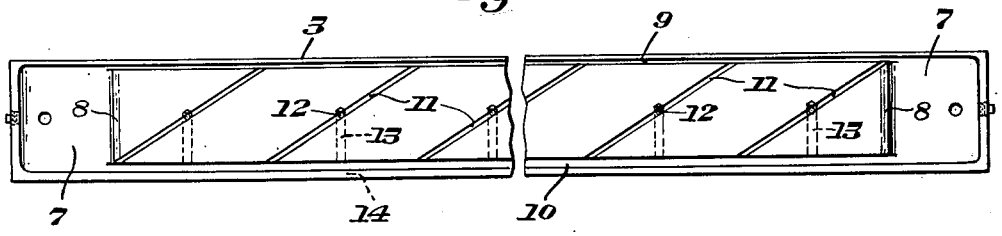
INVENTOR
August A. Saul Patented Mar. 10, 1953

2,631,068

UNITED STATES PATENT OFFICE 2,631,068

LUBRICATION OF TRACK-BORNE MECHANISM

August A. Saul, Ross Township, Allegheny County, Pa., assignor to Miller Printing Machinery Co., Pittsburgh, Pa., a corporation of Pennsylvania Application June 10, 1947, Serial No. 753,668

12 Claims. (Cl. 308—5)

This invention relates to lubrication of track-borne mechanism. It has to do with the supplying of lubricant to tracks which support mechanism movable thereupon.

While my invention is broadly applicable to the lubrication of track-borne mechanism it is of especial utility in the lubrication of printing or like presses having oscillatory beds. One type of such mechanism to which I have successfully applied the invention is a flat bed and cylinder printing press. For purposes of explanation and illustration the invention will be described as embodied in means for and a method of lubricating the tracks supporting an oscillatory bed of a flat bed and cylinder printing press.

It is important that the bed of a flat bed and cylinder printing press be very accurately supported and guided in its oscillatory movements. The bed cooperates with the impression cylinder to print upon material disposed between the bed and cylinder so the bed must be accurately positioned and guided to properly cooperate with the cylinder. Excessive friction between the bed and its supporting mechanism must be guarded against, especially in high speed presses, not only because such friction may result in damage to the mechanism but also because high temperatures incident to excessive friction may cause interference with proper operative relationship of the bed and cylinder.

Many proposals for the lubrication of the bed in flat bed and cylinder printing presses have been made. It has heretofore been considered impracticable to attempt to mount a bed upon tracks with portions of the bed, or strips connected with the bed, sliding on the tracks and lubricated by an oil film disposed between the strips and the tracks. While an oil film may be maintained at very slow speeds it has not heretofore been considered possible to maintain a satisfactory oil film at the high speeds at which presses now operate. Consequently it has been customary for many years to mount the beds of flat bed and cylinder printing presses upon anti-friction rollers. The use of anti-friction rollers for supporting and guiding the press bed has been recognized as being undesirable, but that method of supporting and guiding the bed has been resorted to because it has been deemed the least unsatisfactory method available. The use of anti-friction rollers imposes greatly added cost in press manufacture; the rollers must be made with extreme accuracy which is a very expensive operation. Moreover, the use of anti-friction rollers also presents a continual upkeep hazard; foreign matter falling on the bed tracks becomes embedded in the tracks by the rolling action of the rollers and results in excessive and premature wear if the condition is not remedied immediately.

I have discovered how to maintain a perfect oil film between bed tracks and strips carried by the bed and riding upon the tracks so that I can mount a press bed directly upon tracks and do away with the objectionable anti-friction rollers. I find it unnecessary to resort to forced feed lubrication. I preferably employ capillary action to deliver lubricant to each track and by the movement of the bed relatively to the track distribute the lubricant on the track. I desirably circulate over the surface of the track contacted by the bed the lubricant from a body or supply of lubricant preferably maintained in a lubricant reservoir. Desirably the lubricant circulates in a path generally along the track and over it and back to the reservoir in the opposite direction along the track. The circulation of the lubricant is preferably accomplished by capillary means.

I desirably employ duct means of capillary size for inducing flow of lubricant from a lubricant supply or reservoir to the bearing surface of the track and duct means of greater than capillary size for returning the lubricant to the reservoir. The first mentioned duct means may extend from the reservoir along the track and be adapted to deliver by capillary action lubricant from the reservoir to the bearing surface of the track and the second mentioned duct means may extend from the reservoir along the track and return the lubricant to the reservoir.

I preferably provide groove means extending across the track intersecting the bearing surface of the track. Lubricant is supplied to the groove means and preferably circulates therethrough. The groove means preferably comprises a series of very shallow wide grooves extending across the track intersecting the bearing surface of the track. Preferably the grooves communicate at one end with a duct, desirably of capillary size, leading from the lubricant reservoir and at the other end with a duct, desirably of greater than capillary size, for returning the lubricant to the reservoir. The grooves desirably extend across the track at an acute angle to the length of the track.

I may employ two lubricant reservoirs, one adjacent each end of the track, lubricant flowing toward the center of the track from each reservoir and then returning to complete the circuit.

I desirably provide at least one hole of capillary size passing through the track and having its outer extremity in the bearing surface of the track and duct means connecting the hole with the lubricant supply so that lubricant may pass from the supply through the hole to the bearing surface of the track. The hole preferably has its outer extremity in a groove in the bearing surface of the track. A passage is preferably provided connecting the hole at a point removed from its outer extremity with the lubricant supply or reservoir.

The groove means in the bearing surface of the track preferably has a width at least ten times its depth and desirably at least fifty times its depth. The groove should be from ten to one hundred times as wide as it is deep and preferably from fifty to one hundred times as wide as it is deep. In a preferred structure I have employed grooves one-half inch wide and .006 inch deep at their central portions, the grooves tapering from maximum depth at their central portions to zero depth at their edges.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same, in which Figure 1 is a fragmentary isometric view of a bed of a flat bed and cylinder press and a track for supporting the bed and along which the bed is slidable;

Figure 2 is an enlarged fragmentary cross-sectional view taken on the line II—II of Figure 1;

Figure 3 is an enlarged fragmentary cross-sectional view taken on the line III—III of Figure 1;

Figure 4 is an enlarged cross-sectional view taken on the line IV—IV of Figure 1; and Figure 5 is a plan view of one of the bed tracks with a portion cut away.

Referring now more particularly to the drawings, there is shown a portion of a flat bed and cylinder printing press having a frame 2 in which are mounted bed tracks designated generally by reference numeral 3. Any suitable number of bed tracks may be employed, two being the number commonly provided. Only one of the tracks is shown in the drawings but as any other bed tracks which are provided may be identical therewith description of one will suffice for all. The press bed is designated by reference numeral 4 and is provided with strips 5 connected with its under face and extending parallel to the length of the tracks, there being one strip 5 for each track 3. Each strip is adapted to lie upon and flush against the top of the corresponding track, provision being made, as will presently be explained, for the continuous supply of lubricant to form and maintain a perfect film of lubricant at all times between the track and strip. Thus no anti-friction rollers need be employed for supporting the bed during its oscillatory movement. The bed itself may be of known construction provided with bed bearers 6 cooperating with cylinder bearers as well known in the art.

Each track has a lubricant reservoir 7 at each end, the bearing surface of the track being slightly tapered adjacent each reservoir at 8. The track has a longitudinal duct 9 of capillary size connecting the two reservoirs 7 and a longitudinal duct 10 of greater than capillary size also connecting the two reservoirs 7. Both of the ducts 9 and 10 terminate in the upper surface of the track. The track has six grooves 11 in its upper or bearing surface, each such groove extending diagonally across the track and being connected at one end with the top of the duct 9 and at the other end with the top of the duct 10. Each of he grooves 11 is very wide and shallow (Figure 2). The groove is preferably at least ten times as wide as it is deep and more preferably at least fifty times as wide as it is deep. The groove may be from ten to one hundred times as wide as it is deep, but is desirably from fifty to one hundred times as wide as it is deep. In a preferred form such a groove is about one-half inch wide and about .006 inch deep. The groove is so shallow that lubricant in it will project above the top of the groove to be spread upon the under surface of the cooperating bed strip which in turn spreads the lubricant on the bearing surface of the track, a perfect oil film being thus maintained.

The track has six holes 12 bored downwardly thereinto through the bearing surface thereof, each of such holes intersecting one of the grooves 11 at about its midpoint. The holes 12 are of capillary size. The track is bored laterally opposite the bottom of each hole 12 to form a duct 13 joining the bottom of the duct 10 and the bottom of the hole 12. A plug 14 closes the side wall of the track opposite each duct 13.

Lubricant is contained in the reservoirs 7, being shown as rising to a level indicated at 15 in Figure 3. The lubricant also fills the ducts 9 and 10 in the longitudinal direction and fills the ducts 13 and the holes 14. Since the duct 9 and the holes 12 are of capillary size lubricant rises in them and is delivered to the bearing surface of the track. The lubricant rising in the duct 9 enters the ends of the grooves 11 terminating in the ducts 9 and flows along those grooves toward the central points thereof. Lubricant rises by capillary action in the holes 12 and is delivered to the grooves 11 in which it flows toward the groove 10. By reason of the capillary action of the liquid in the duct 9 and the holes 12 a continuous circulation of lubricant is maintained from each lubricant reservoir 7 through the duct 9 toward the longitudinal center of the track, from the duct 9 across the track and through the grooves 11 and from the holes 12 through the grooves 11 to the duct 10. Lubricant flows from the longitudinal center of the track toward each end through the duct 10 and is supplied to the holes 12 from the duct 10 through the ducts 13.

The capillary action of the lubricant in the duct 9 and the holes 12 is itself sufficient to cause a continuous circulation of the lubricant. Thus at least the grooves 11 are always supplied with lubricant even when the press is not operating. The grooves 11 are so shallow that the lubricant standing in them contacts the bottom surface of the strip 5 and is by the strip distributed over the bearing surface of the track. The reciprocating movement of the bed over the tracks accelerates the circulation of the lubricant and insures maintenance of a perfect oil film between the strips 5 and the tracks 3.

While I prefer to employ a longitudinal duct of capillary size and holes of capillary size intersecting the bearing surface of the track it is possible, at least in some instances, to dispense with one or the other of these. That is, the longitudinal duct 9 may be made of greater than capillary size or the holes 12 may be made of greater than capillary size. When the longitudinal duct 9 is made of greater than capillary size the lubricant delivered through the holes 12 by capillary action effects lubrication of the track. When the holes 12 are made of greater than capillary size the lubricant delivered by capillary action from the duct 9 supplies the oil film. The holes 12 may in some cases be dispensed with entirely. Alternatively, more than one hole 12 may be provided in each groove 11. The number of grooves 11 and the angularity thereof may be varied in different installations. I find that the lubricant circulates by capillary action even when its level in the reservoirs 7 falls appreciably. It is not necessary that the lubricant level be maintained near the top of the reservoirs.

My lubricating method and apparatus not only insure maintenance of a perfect oil film between the tracks and the bed strips but provide for great economy in use of oil. The oil is recirculated and no substantial amount of oil is lost except by evaporation. The lubricant reservoirs 7 serve also as settling basins wherein sediment in the oil settles out. Although a continuous circulation of oil is maintained the oil circulates very slowly and permits settling out of sediment in the reservoirs 7. The sediment may be removed by scooping out the oil in the reservoirs 7 without draining all the oil from the circulating system.

My apparatus is self-cleaning in contrast to apparatus employing anti-friction rollers which as explained above present a continual upkeep hazard. Foreign matter falling on the tracks is automatically removed and conducted away in the lubricant and does not become embedded in the tracks.

While I have shown and described a present preferred embodiment of the invention and have illustrated a present preferred method of practicing the same it is to be distinctly understood that the invention is not limited thereto but may be otherwise variously embodied and practiced within the scope of the following claims.

I claim:

1. In track-borne mechanism, a track, a lubricant reservoir, duct means of capillary size extending from the reservoir along the track and duct means of greater than capillary size extending from the reservoir along the track, the first mentioned duct means being adapted to deliver by capillary action lubricant from the reservoir to the bearing surface of the track and the second mentioned duct means being adapted to return the lubricant to the reservoir.

2. In track-borne mechanism, a track, a lubricant reservoir, duct means of capillary size extending from the reservoir along the track, duct means of greater than capillary size extending from the reservoir along the track and groove means extending across the track intersecting the bearing surface of the track and communicating at one end with the first mentioned duct means and at the other end with the second mentioned duct means.

3. In track-borne mechanism, a track, a lubricant reservoir, duct means of capillary size extending from the reservoir along the track, duct means of greater than capillary size extending from the reservoir along the track and a series of very shallow wide grooves extending across the track intersecting the bearing surface of the track and communicating at one end with the first mentioned duct means and at the other end with the second mentioned duct means.

4. In track-borne mechanism, a track, a lubricant reservoir, duct means of capillary size extending from the reservoir along the track, duct means of greater than capillary size extending from the reservoir along the track and a groove extending across the track at an acute angle to the length of the track intersecting the bearing surface of the track and communicating at one end with the first mentioned duct means and at the other end with the second mentioned duct means 5. In track-borne mechanism, a track, two lubricant reservoirs, one adjacent each end of the track, duct means of capillary size extending along the track and communicating with both reservoirs and duct means of greater than capillary size extending along the track and communicating with both reservoirs, both the first mentioned duct means and the second mentioned duct means intersecting the bearing surface of the track.

6. In track-borne mechanism, a track, two lubricant reservoirs spaced apart in the direction of the length of the track, duct means of capillary size extending along the track and communicating with both reservoirs, duct means of greater than capillary size extending along the track and communicating with both reservoirs and groove means extending across the track intersecting the bearing surface of the track and communicating at one end with the first mentioned duct means and at the other end with the second mentioned duct means.

7. In track-borne mechanism, a track, a lubricant reservoir, a pair of generally parallel ducts extending from the reservoir along the track, a hole of capillary size passing through the track and having its outer extremity in the bearing surface of the track and a passage connecting the hole with one of the ducts.

8. In track-borne mechanism, a track, a lubricant reservoir, duct means of capillary size extending from the reservoir along the track, duct means of greater than capillary size extending from the reservoir along the track, a hole of capillary size passing through the track and having its outer extremity in the bearing surface of the track and a passage connecting the hole at a point removed from its outer extremity with one of the ducts.

9. In track-borne mechanism, a track, a lubricant reservoir, duct means of capillary size extending from the reservoir along the track, duct means of greater than capillary size extending from the reservoir along the track, groove means extending across the track intersecting the bearing surface of the track and communicating at one end with the first mentioned duct means and at the other end with the second mentioned duct means, a hole of capillary size passing through the track and having its outer extremity in said groove means and a passage connecting the hole at a point removed from its outer extremity with a supply of lubricant from the reservoir.

10. In track-borne mechanism, a track, two lubricant reservoirs, one adjacent each end of the track, duct means of capillary size extending along the track and communicating with both reservoirs, duct means of greater than capillary size extending along the track and communicating with both reservoirs, a series of generally parallel grooves extending across the track at an acute angle to the length of the track intersecting the bearing surface of the track and each communicating at one end with the first mentioned duct means and at the other end with the second mentioned duct means, a series of holes of capillary size passing through the track and each having its outer extremity in one of said grooves and a passage connecting each hole at a point removed from its outer extremity with the second mentioned duct means.

11. In track-borne mechanism, a track, a lubricant reservoir, duct means of capillary size extending from the reservoir along the track, duct means of greater than capillary size extending from the reservoir along the track and a groove whose width is at least fifty times its depth extending across the track intersecting the bearing surface of the track and communicating at one end with the first mentioned duct means and at the other end with the second mentioned duct means.

12. In track-borne mechanism, a track, a lubricant reservoir, duct means of capillary size extending from the reservoir along the track, duct means of greater than capillary size extending from the reservoir along the track, groove means whose width is at least ten times its depth extending across the track intersecting the bearing surface of the track and communicating at one end with the first mentioned duct means and at the other end with the second mentioned duct means, a hole of capillary size passing through the track and having its outer extremity in said groove means and a passage connecting the hole at a point removed from its outer extremity with a supply of lubricant from the reservoir.

AUGUST A. SAUL.

REFERENCES CITED

The following references are of record in the file of this patent:

UNITED STATES PATENTS

| Number | Name | Date |
|---|---|---|
| 339,965 | Brantley | Apr. 13, 1886 |
| 1,184,050 | Toeplitz | May 23, 1916 |
| 1,669,504 | Baker | May 15, 1928 |
| 1,712,006 | Moore | May 7, 1929 |
| 1,781,149 | Zimmerman | Nov. 11, 1930 |
| 1,847,524 | Dezendorf | Mar. 1, 1932 |
| 2,322,004 | Fast | June 15, 1943 |

FOREIGN PATENTS

| Number | Country | Date |
|---|---|---|
| 605,097 | France | May 19, 1926 |
| 169,125 | Switzerland | Aug. 1, 1934 |